(12) United States Patent
Choi et al.

(10) Patent No.: US 12,256,339 B2
(45) Date of Patent: Mar. 18, 2025

(54) APPARATUS FOR ASSIGNING POWER BASED ON POSITION OF TERMINAL AND METHOD THEREOF

(71) Applicant: AGENCY FOR DEFENSE DEVELOPMENT, Daejeon (KR)

(72) Inventors: Hyeok Gyu Choi, Daejeon (KR); Seung Ho Kim, Daejeon (KR); Chul Hee Choi, Daejeon (KR); Ju Hyung Lee, Daejeon (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 365 days.

(21) Appl. No.: 17/893,465

(22) Filed: Aug. 23, 2022

(65) Prior Publication Data

US 2023/0063042 A1 Mar. 2, 2023

(30) Foreign Application Priority Data

Aug. 25, 2021 (KR) .......................... 10-2021-0112445

(51) Int. Cl.
*H04W 52/28* (2009.01)
*H04B 7/185* (2006.01)
*H04W 52/14* (2009.01)

(52) U.S. Cl.
CPC ................................. *H04W 52/283* (2013.01)

(58) Field of Classification Search
None
See application file for complete search history.

(56) References Cited

U.S. PATENT DOCUMENTS

| 6,321,065 | B1 * | 11/2001 | Wilcoxson | ......... | H04B 7/18543 |
| | | | | | 342/359 |
| 9,871,579 | B2 * | 1/2018 | Kang | .................. | H04B 7/18539 |
| 10,103,832 | B2 | 10/2018 | Koutsimanis et al. | | |
| 11,277,802 | B2 * | 3/2022 | Alasti | .................. | H04W 52/242 |
| 11,569,902 | B2 * | 1/2023 | Zhang | .................. | H04W 74/00 |
| 11,641,644 | B2 * | 5/2023 | Badic | .................... | G05D 1/6987 |
| | | | | | 370/329 |

(Continued)

FOREIGN PATENT DOCUMENTS

KR 100873173 B1 12/2008
KR 20170109015 A 9/2017

(Continued)

OTHER PUBLICATIONS

Office Action Mailed Mar. 1, 2023 for corresponding Korean Patent Application No. 10-2021-0112445 w/English translation.

*Primary Examiner* — Tuan A Tran
(74) *Attorney, Agent, or Firm* — MILES & STOCKBRIDGE P.C.

(57) ABSTRACT

Disclosed is an operation method of an electronic apparatus assigning power based on a position of a terminal, the method including receiving data transmission requests from a first terrestrial terminal and a second terrestrial terminal, wherein the first terrestrial terminal and the second terrestrial terminal use overlapped frequency resources, and assigning a first transmission power intensity to the first terrestrial terminal and assigning a second transmission power intensity to the second terrestrial terminal based on a position of the first terrestrial terminal and a position of the second terrestrial terminal.

9 Claims, 10 Drawing Sheets

(56) References Cited

U.S. PATENT DOCUMENTS

| | | | | |
|---|---|---|---|---|
| 11,671,170 B2* | 6/2023 | Levy | ............... | H04B 7/18517 |
| | | | | 455/12.1 |
| 11,671,923 B2* | 6/2023 | Alasti | ............. | H04W 52/228 |
| | | | | 455/522 |
| 11,881,928 B2* | 1/2024 | Gineste | .............. | H04B 7/18504 |
| 12,063,097 B2* | 8/2024 | Liu | ................. | H04W 52/247 |
| 2005/0025100 A1* | 2/2005 | Lee | ................. | H04W 72/535 |
| | | | | 370/335 |
| 2006/0045046 A1* | 3/2006 | Kim | ................. | H04W 52/386 |
| | | | | 370/329 |
| 2008/0187065 A1 | 8/2008 | Chang et al. | | |
| 2016/0277063 A1 | 9/2016 | Liu | | |
| 2017/0289921 A1* | 10/2017 | Kim | ................. | H04W 52/242 |
| 2017/0331573 A1 | 11/2017 | Li | | |
| 2019/0020388 A1 | 1/2019 | Lee et al. | | |
| 2019/0165906 A1 | 5/2019 | Bala et al. | | |
| 2021/0378024 A1* | 12/2021 | Cao | ................. | H04W 52/243 |

FOREIGN PATENT DOCUMENTS

| | | |
|---|---|---|
| KR | 101792626 B1 | 11/2017 |
| KR | 20190005155 A | 1/2019 |
| KR | 20210030171 A | 3/2021 |
| WO | 2017026700 A1 | 2/2017 |

\* cited by examiner

APPARATUS FOR ASSIGNING POWER BASED ON POSITION OF TERMINAL AND METHOD THEREOF

CROSS-REFERENCE TO RELATED APPLICATION(S)

This application claims the benefit of Korean Patent Application No. 10-2021-0112445, filed on Aug. 25, 2021, in the Korean Intellectual Property Office, which is incorporated herein by reference.

BACKGROUND

1. Field of the Invention

The embodiments of the present invention relate to an systems, devices, methods, and instructions for assigning power based on a position of a terminal. More particularly, the embodiments of the present invention relate to technology for assigning different intensities of power to a plurality of terminals which use overlapped frequency resources based on positions of the corresponding terminals, thereby canceling an interference from a signal transmitted and received in relation to the plurality of terminals without needing to continuously monitor a channel state.

2. Description of the Related Art

Non-orthogonal multiple access (NOMA) is a technology for improving frequency utilization efficiency and connectivity by transmitting multiple user signals at the same time to overlap the signals and canceling signal-to-signal interference based on successive interference cancellation (SIC) in a receiver.

The NOMA may correspond to a technology that allows a plurality of terminals to transmit and receive signals when the same frequency resource is assigned to the plurality of terminals. That is, by allowing the plurality of terminals to use the same frequency resource, frequency use efficiency may be increased. In this specification, the expression of a plurality of terminals which "use overlapped frequency resources" may be understood as describing a case in which the same frequency resource is assigned to the plurality of terminals.

FIG. 1 is a diagram illustrating NOMA according to a related art. Referring to FIG. 1, in a situation in which an overlapped signal 101 transmitted by a transmitter is received in user equipment 1 (e.g., $UE_1$) and user equipment 2 (e.g., $UE_2$), a signal to be transmitted to $UE_1$ (hereinafter, referred to as a $UE_1$ signal 120) and a signal to be transmitted to $UE_2$ (hereinafter, referred to as a $UE_2$ signal 110) may be differently determined based on each channel gain. For example, when a situation of a channel between the transmitter and $UE_2$ is inferior to a situation of a channel between the transmitter and $UE_1$, larger transmission power may be assigned for transmission of the $UE_2$ signal.

In response to the overlapped signal 101 between the $UE_1$ signal 120 and the $UE_2$ signal 110 reaching $UE_1$, $UE_1$ may perform SIC. Specifically, as indicated by a block 102, $UE_1$ may demodulate the $UE_2$ signal having a higher signal intensity first, regenerate the $UE_2$ signal 110, and eliminate the regenerated signal in an original signal, thereby restoring a frequency waveform of the $UE_1$ signal. In this way, $UE_1$ may demodulate the signal in which the regenerated signal is eliminated as indicated by a block 104 and receive information as indicated by reference numeral 105. In contrast, although $UE_2$ receives the overlapped signal 101 between the $UE_1$ signal 120 and the $UE_2$ signal 110, the $UE_1$ signal 120 may be relatively less in intensity. Accordingly, $UE_2$ may recognize the $UE_1$ signal as an interference and demodulate the $UE_2$ signal 110 directly as indicated by reference numerals 102 and 106.

As such, when overlapped signal between signals is transmitted and received, the signals may be demodulated by performing the SIC based on intensities of the signals or neglecting a signal less in intensity.

In a typical NOMA system, a transmitter and a receiver may consistently monitor a channel state between the transmitter and the receiver to check the channel state therebetween. In addition, the transmitter may provide a monitoring result of the channel state to the receiver. In this process, a separate device and a channel for reporting may be required to monitor the channel state and report the monitoring result.

SUMMARY

An aspect provides systems, devices, methods, and instructions for receiving data transmission requests from a first terrestrial terminal and a second terrestrial terminal, wherein the first terrestrial terminal and the second terrestrial terminal use overlapped frequency resources through an uplink, and assigning a first transmission power intensity and a second transmission power intensity to the first terrestrial terminal and the second terrestrial terminal based on positions of the first terrestrial terminal and the second terrestrial terminal.

Another aspect also provides systems, devices, methods, and instructions for receiving data reception requests from a first terrestrial terminal and a second terrestrial terminal, wherein the first terrestrial terminal and the second terrestrial terminal use overlapped frequency resources through a downlink, and assigning a first transmission power intensity corresponding to the first terrestrial terminal and a second transmission power intensity corresponding to the second terrestrial terminal based on a position of the first terrestrial terminal and a position of the second terrestrial terminal.

Technical goals to be achieved through the example embodiments are not limited to the technical goals as described above, and other technical tasks can be inferred from the following example embodiments.

According to an aspect, there is provided systems, devices, methods, and instructions for performing an uplink-related operation in an electronic apparatus, including receiving data transmission requests from a first terrestrial terminal and a second terrestrial terminal, wherein the first terrestrial terminal and the second terrestrial terminal use overlapped frequency resources, and assigning a first transmission power intensity to the first terrestrial terminal and assigning a second transmission power intensity to the second terrestrial terminal based on a position of the first terrestrial terminal and a position of the second terrestrial terminal.

The systems, devices, methods, and instructions may further include assigning, in response to the data transmission requests, channels for receiving a signal having the first transmission power intensity and a signal having the second transmission power intensity.

The assigning of the first transmission power intensity and the second transmission power intensity may include comparing a distance to which the first terrestrial terminal is separated from a center of a satellite antenna beam corresponding to the electronic apparatus and a distance to which the second terrestrial terminal is separated from the center of the satellite antenna beam, and assigning a relatively high transmission power intensity to a terminal located relatively close to the center of the satellite antenna beam as a result of the comparing. Here, in a concentric satellite antenna beam, the closer to the center, the higher the antenna gain. Thus, a relative comparison of a satellite antenna beam gain for each terminal is possible based on a comparison between separation distances from the satellite antenna beam center to terrestrial terminals. Meanwhile, in a satellite antenna beam of a shape other than a concentric circle, the relative comparison of the satellite antenna beam gain for each terminal may be performed using a satellite antenna gain contour based on a ground surface at a position of the terrestrial terminal.

The systems, devices, methods, and instructions may further include receiving a signal having the first transmission power intensity and transmitted by the first terrestrial terminal and a signal having the second transmission power intensity and transmitted by the second terrestrial terminal, demodulating a signal transmitted by a terminal located relatively close to a center of a satellite antenna beam corresponding to the electronic apparatus, the terminal being one of the first terrestrial terminal and the second terrestrial terminal, and demodulating, after the signal transmitted by the terminal is demodulated, a signal transmitted by a terminal located relatively far from the center of the satellite antenna beam, the terminal being a remaining one of the first terrestrial terminal and the second terrestrial terminal.

In the various systems, devices, methods, and instructions, the electronic apparatus may periodically receive position information from a plurality of terrestrial terminals including the first terrestrial terminal and the second terrestrial terminal.

According to another aspect, there is also provided systems, devices, methods, and instructions for performing a downlink-related operation in an electronic apparatus, including receiving data reception requests from a first terrestrial terminal and a second terrestrial terminal, wherein the first terrestrial terminal and the second terrestrial terminal use overlapped frequency resources, and assigning a first transmission power intensity corresponding to the first terrestrial terminal and assigning a second transmission power intensity corresponding to the second terrestrial terminal based on a position of the first terrestrial terminal and a position of the second terrestrial terminal.

The assigning of the first transmission power intensity and the second transmission power intensity may include comparing a distance to which the first terrestrial terminal is separated from a center of a satellite antenna beam corresponding to the electronic apparatus and a distance to which the second terrestrial terminal is separated from the center of the satellite antenna beam, and assigning a relatively low transmission power intensity to a terminal located relatively close to the center of the satellite antenna beam as a result of the comparing. Here, in a concentric satellite antenna beam, the closer to the center, the higher the antenna gain. Thus, a relative comparison of a satellite antenna beam gain for each terminal is possible based on a comparison between separation distances from the satellite antenna beam center to terrestrial terminals. Meanwhile, in a satellite antenna beam of a shape other than a concentric circle, the relative comparison of the satellite antenna beam gain for each terminal may be performed using a satellite antenna gain contour based on a ground surface at a position of the terrestrial terminal.

The systems, devices, methods, and instructions may further include overlapping a signal having the first transmission power intensity and a signal having the second transmission power intensity and transmitting an overlapped signal through a downlink.

In the various systems, devices, methods, and instructions, the electronic apparatus may periodically receive position information from a plurality of terrestrial terminals including the first terrestrial terminal and the second terrestrial terminal.

According to another aspect, there is also provided an electronic apparatus for performing an uplink-related operation, the electronic apparatus including a communication device configured to receive data transmission requests from a first terrestrial terminal and a second terrestrial terminal, wherein the first terrestrial terminal and the second terrestrial terminal use overlapped frequency resources, a memory in which at least one instruction is stored, and a controller configured to assign a first transmission power intensity to the first terrestrial terminal and assign a second transmission power intensity to the second terrestrial terminal based on a position of the first terrestrial terminal and a position of the second terrestrial terminal.

According to another aspect, there is also provided an electronic apparatus for performing a downlink-related operation, the electronic apparatus including a communication device configured to receive data reception requests from a first terrestrial terminal and a second terrestrial terminal, wherein the first terrestrial terminal and the second terrestrial terminal use overlapped frequency resources, a memory in which at least one instruction is stored, and a controller configured to assign a first transmission power intensity corresponding to the first terrestrial terminal and assign a second transmission power intensity corresponding to the second terrestrial terminal.

According to example embodiments, it is possible to cancel an interference for a signal transmitted and received in relation to a plurality of terminals without needing to continuously monitor a channel state by assigning power of different intensities based on positions of the terminals.

It is to be understood that both the foregoing general description and the following detailed description are examples and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION

Figure 1:
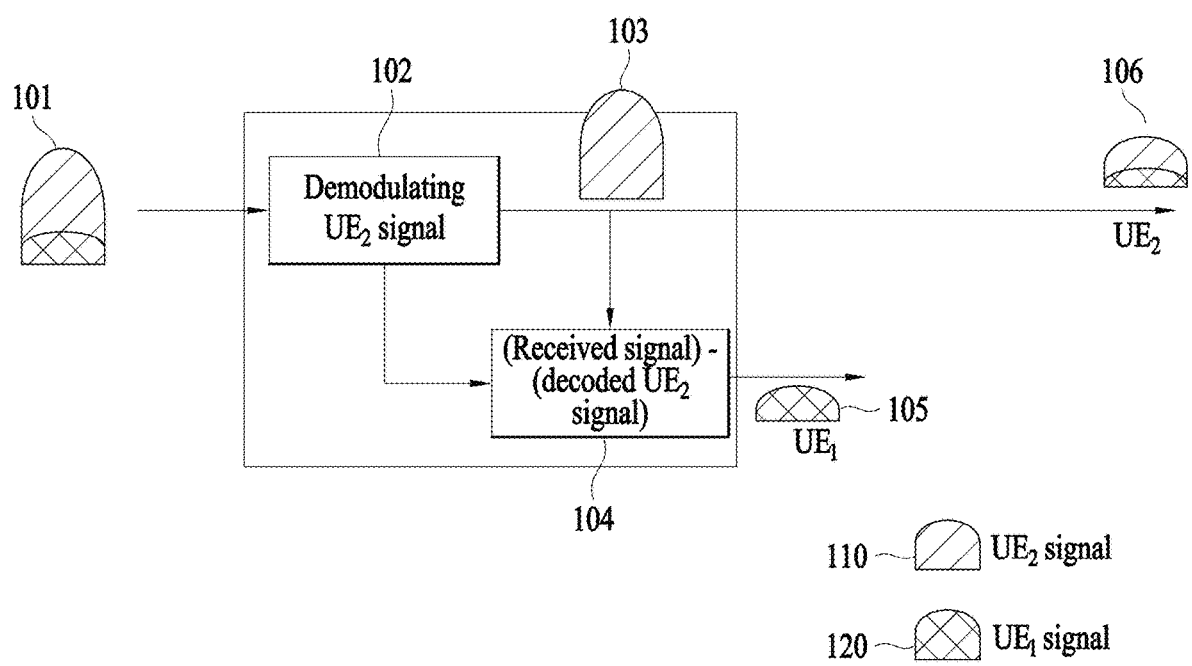
FIG. 1 is a conceptual diagram illustrating non-orthogonal multiple access according to a related art.

The terms used in the embodiments are selected, as much as possible, from general terms that are widely used at present while taking into consideration the functions obtained in accordance with the present disclosure, but these terms may be replaced by other terms based on intentions of those skilled in the art, customs, emergence of new technologies, or the like. Also, in a particular case, terms that are arbitrarily selected by the applicant of the present disclosure may be used. In this case, the meanings of these terms may be described in corresponding description parts of the disclosure. Accordingly, it should be noted that the terms used herein should be construed based on practical meanings thereof and the whole content of this specification, rather than being simply construed based on names of the terms.

In the entire specification, when an element is referred to as "including" another element, the element should not be understood as excluding other elements so long as there is no special conflicting description, and the element may include at least one other element. In addition, the terms "unit" and "module", for example, may refer to a component that exerts at least one function or operation, and may be realized in hardware or software, or may be realized by combination of hardware and software.

The expression "at least one of A, B, and C" may include the following meaning: A alone; B alone; C alone; both A and B together; both A and C together; both B and C together; or all three of A, B, and C together.

In the present disclosure, a "terminal" may be implemented as a computer or a portable terminal capable of accessing a server or another terminal through a network. Here, the computer may include, for example, a laptop computer, a desktop computer, and a notebook equipped with a web browser. The portable terminal may be a wireless communication device ensuring a portability and a mobility, and include any type of handheld wireless communication device, for example, a tablet PC, a smartphone, a communication-based terminal such as international mobile telecommunication (IMT), code division multiple access (CDMA), W-code division multiple access (W-CDMA), and long term evolution (LTE).

In the following description, example embodiments of the present disclosure will be described in detail with reference to the drawings so that those skilled in the art can easily carry out the present disclosure. The present disclosure may be embodied in many different forms and is not limited to the embodiments described herein.

Hereinafter, example embodiments of the present invention will be described with reference to the drawings.

In describing the example embodiments, descriptions of technical contents that are well known in the art to which the present disclosure belongs and are not directly related to the present specification will be omitted. This is to more clearly communicate without obscuring the subject matter of the present specification by omitting unnecessary description.

For the same reason, in the accompanying drawings, some components are exaggerated, omitted or schematically illustrated. In addition, the size of each component does not fully reflect the actual size. The same or corresponding components in each drawing are given the same reference numerals.

Advantages and features of the present invention and methods of achieving them will be apparent from the following example embodiments that will be described in more detail with reference to the accompanying drawings. It should be noted, however, that the present invention is not limited to the following example embodiments, and may be implemented in various forms. Accordingly, the example embodiments are provided only to disclose the present invention and let those skilled in the art know the category of the present disclosure. In the drawings, embodiments of the present invention are not limited to the specific examples provided herein and are exaggerated for clarity. The same reference numerals or the same reference designators denote the same elements throughout the specification.

At this point, it will be understood that each block of the flowchart illustrations and combinations of flowchart illustrations may be performed by computer program instructions. Since these computer program instructions may be mounted on a processor of a general purpose computer, special purpose computer, or other programmable data processing equipment, those instructions executed through the computer or the processor of other programmable data processing equipment may create a means to perform the functions be described in flowchart block(s). These computer program instructions may be stored in a computer usable or computer readable memory that can be directed to a computer or other programmable data processing equipment to implement functionality in a particular manner, and thus the computer usable or computer readable memory. It is also possible for the instructions stored in to produce an article of manufacture containing instruction means for performing the functions described in the flowchart block(s). Computer program instructions may also be mounted on a computer or other programmable data processing equipment, such that a series of operating steps may be performed on the computer or other programmable data processing equipment to create a computer-implemented process to create a computer or other programmable data. Instructions for performing the processing equipment may also provide steps for performing the functions described in the flowchart block(s).

In addition, each block may represent a portion of a module, segment, or code that includes one or more executable instructions for executing a specified logical function(s). It should also be noted that in some alternative implementations, the functions noted in the blocks may occur out of order. For example, the two blocks shown in succession may in fact be executed concurrently, substantially concurrently, or the blocks may sometimes be executed in the reverse order, depending on the corresponding function.

Figure 2:
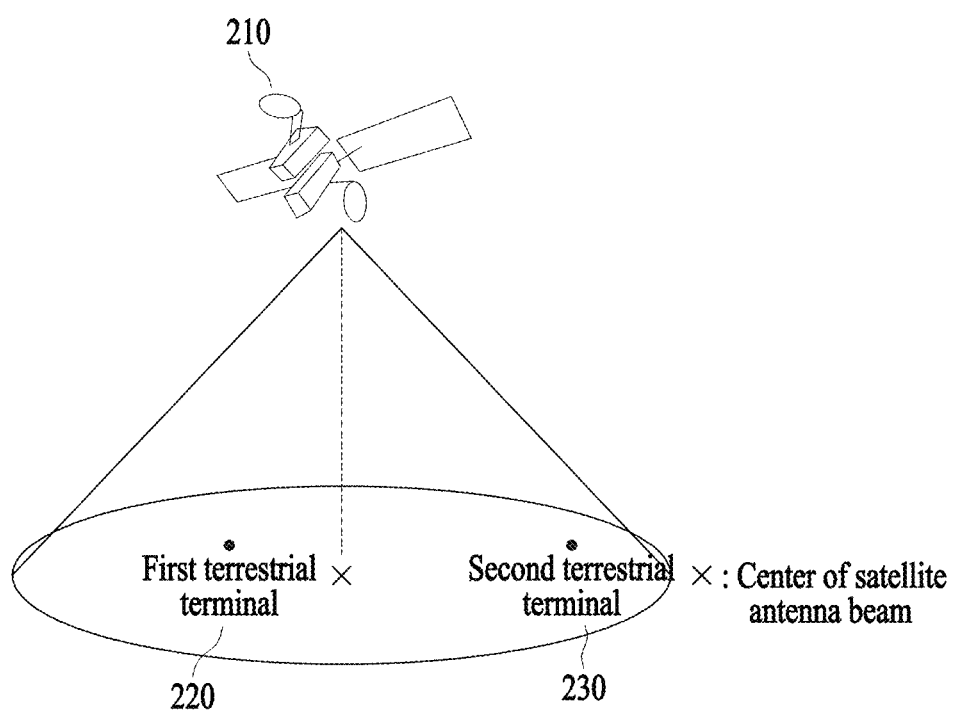
FIG. 2 is a diagram illustrating a power assignment system according to an example embodiment.

FIG. 2 is a diagram illustrating a power assignment system according to an example embodiment.

According to various example embodiments, a power assignment system includes an electronic apparatus 210, a first terrestrial terminal 220, and a second terrestrial terminal 230. In addition, the power assignment system may include a network supporting information transmission and reception performed among at least a portion of the electronic apparatus 210, the first terrestrial terminal 220, and the second terrestrial terminal 230. Also, in some cases, the power assignment system may further include one or more terrestrial terminals in addition to the first terrestrial terminal 220 and the second terrestrial terminal 230. In such cases, the electronic apparatus 210 may transmit and receive information to and from the one or more terrestrial terminals in addition to the first terrestrial terminal 220 and the second terrestrial terminal 230.

Each of the electronic apparatus 210, the first terrestrial terminal 220, and the second terrestrial terminal 230 may include a communication device, a memory, and a controller. The controller may include the processor or correspond to the processor. In addition, each of the electronic apparatus 210, the first terrestrial terminal 220, and the second terrestrial terminal 230 may refer to a component that processes at least one function or operation, and may be implemented through hardware or software, or a combination of hardware and software.

According to an example embodiment, the electronic apparatus 210, the first terrestrial terminal 220, and the second terrestrial terminal 230 may include computer software or a plurality of computer systems implemented as a network server. For example, at least some of the electronic apparatus 210, the first terrestrial terminal 220, and the second terrestrial terminal 230 may refer to computer software and a computer system connected to a sub-device that communicates with another network server through a computer network such as an intranet or the Internet to receive a request to perform a task, perform the task, and provide a result of the task. In addition, at least some of the electronic apparatus 210, the first terrestrial terminal 220, and the second terrestrial terminal 230 may be understood as broad concepts including a series of application programs to be operated on a network server and various databases built inside or in other nodes connected. For example, at least some of the electronic apparatus 210, the first terrestrial terminal 220, and the second terrestrial terminal 230 may be implemented using a network server program that is provided in various ways based on an operating system such as DOS, Windows, Linux, UNIX, Mac OS, or the like.

The electronic apparatus 210 is an apparatus that transmits and receives information to and from a terrestrial terminal. The electronic apparatus 210 constructs various information and provides the information to another apparatus including the terrestrial terminal. The electronic apparatus 210 serves as a central station that integrally manages position information, waveform information, and transmission power level information for each terrestrial terminal. For example, the electronic apparatus 210 may serve to assign transmission power intensities to the first terrestrial terminal 220 and the second terrestrial terminal 230.

The electronic apparatus 210 may receive position information from a plurality of terrestrial terminals including the first terrestrial terminal 220 and the second terrestrial terminal 230. The position information may be periodically received. An operation of receiving the position information by the electronic apparatus 210 from the plurality of terrestrial terminals including the first terrestrial terminal 220 and the second terrestrial terminal 230 may be performed in both uplink operation and downlink operation.

According to an example embodiment, the plurality of terrestrial terminals may transmit the position information to other terrestrial terminals in addition to the electronic apparatus 210. For example, the first terrestrial terminal 220 may transmit the position information to the electronic apparatus 210 and the second terrestrial terminal 230. In some cases, the plurality of terrestrial terminals may transmit the position information to the electronic apparatus 210 only, and the electronic apparatus 210 transmits the received position information to another terminal. In such cases, the plurality of terminals may identify their mutual positions.

In addition, the electronic apparatus 210 according to an example embodiment may serve as a satellite antenna that emits a beam. For example, the electronic apparatus 210 may serve to receive a signal from a terrestrial terminal and demodulate the received signal, or to transmit a signal to the terrestrial terminal. When the electronic apparatus 210 serves as the satellite antenna, the electronic apparatus 210 may be an apparatus including a transceiver repeater having a function to generate a signal to be transmitted to the terrestrial terminal.

In this specification, demodulating the received signal by the electronic apparatus 210 may indicate restoring the received signal to be an original signal in data communication, and may be understood as including an operation of decoding an encoded signal in addition to an operation of demodulating a modulated signal.

For ease and convenience of descriptions, the following description will be made based on an example in which the electronic apparatus 210 serves as the satellite antenna as well as the central station. However, this is merely an example, and the embodiments are not limited to a case in which functions of the central station and the satellite antenna are performed in one physical device. Specifically, when the satellite antenna and the central station correspond to physically different devices, a description related to an operation of the electronic apparatus 210 receiving a signal from the terrestrial terminal to demodulate the received signal or transmitting a signal to the terrestrial terminal may be understood as a description for the satellite antenna, and remaining descriptions related to the electronic apparatus 210 may still be understood as a description for the electronic apparatus 210.

Hereinafter, the expression of the first terrestrial terminal 220 and the second terrestrial terminal 230 which "use overlapped frequency resources" may be understood as describing a case in which resources of the same frequency band are assigned to the first terrestrial terminal 220 and the second terrestrial terminal 230 or a case in which the same frequency resources are assigned to the first terrestrial terminal 220 and the second terrestrial terminal 230.

In an uplink-related operation, the electronic apparatus 210 may receive data transmission requests from the first terrestrial terminal 220 and the second terrestrial terminal 230 which use overlapped frequency resources and assign a first transmission power intensity and a second transmission power intensity to the first terrestrial terminal 220 and the second terrestrial terminal 230 based on a position of the first terrestrial terminal 220 and a position of the second terrestrial terminal 230.

The uplink-related operation of the electronic apparatus 210 will be described in greater detail with reference to FIGS. 3A, 4, and 5.

In a downlink-related operation, the electronic apparatus 210 may receive data reception requests from the first terrestrial terminal 220 and the second terrestrial terminal 230 which use overlapped frequency resources and assign a first transmission power intensity corresponding to the first terrestrial terminal 220 and a second transmission power intensity corresponding to the second terrestrial terminal 230 based on a position of the first terrestrial terminal 220 and a position of the second terrestrial terminal 230.

The downlink-related operation of the electronic apparatus 210 will be described in greater detail with reference to FIGS. 3B, 6, and 7.

The first terrestrial terminal 220 and the second terrestrial terminal 230 may include an apparatus for accessing a server or another terminal through a network and may be implemented as a computer or a mobile terminal. Each terminal may use a frequency resource for its operation. At least a portion of the frequency resource used by the first terrestrial terminal 220 may overlap the frequency resource used by the second terrestrial terminal 230. For example, the frequency resource used by the first terrestrial terminal 220 and the frequency resource used by the second terrestrial terminal 230 may be understood as concepts including a set or range of resources to be assigned to the first terrestrial terminal 220 and the second terrestrial terminal 230 according to a situation, instead of indicating specific resources actually assigned to the first terrestrial terminal 220 and the second terrestrial terminal 230. As for the first terrestrial terminal 220 and the second terrestrial terminal 230, a use of a NOMA technique may be assumed.

According to an example embodiment, the first terrestrial terminal 220 and the second terrestrial terminal 230 may be located in a beam area of the electronic apparatus 210. The embodiments are not limited to the case in which the first terrestrial terminal 220 and the second terrestrial terminal 230 are located in the beam area of the electronic apparatus 210. However, when at least one of the first terrestrial terminal 220 and the second terrestrial terminal 230 is not located in the beam area of the electronic apparatus 210, a signal may not be transmitted and received to and from one of the first terrestrial terminal 220 and the second terrestrial terminal 230. In this case, even if the signal is transmitted and received, an intensity of the signal may be relatively small. Thus, the transmitted and received signal may require relatively less interference cancellation. Accordingly, for ease and convenience of descriptions, the following descriptions will be made based on the first terrestrial terminal 220 and the second terrestrial terminal 230 located in the beam area of the electronic apparatus 210. However, the following descriptions are also applicable to a case in which at least one of the first terrestrial terminal 220 and the second terrestrial terminal 230 is not located in the beam area of the electronic apparatus 210.

In addition, for ease and convenience of descriptions, the following description will be made under an assumption that the first terrestrial terminal 220 is located closer to a center of a satellite antenna beam corresponding to the electronic apparatus 210 when compared to the second terrestrial terminal 230.

Operations related to a power assignment method according to various example embodiments may be implemented by a single physical device or may be implemented by a plurality of physical devices combined organically. For example, some of the components included in the power assignment system may be implemented as one physical device, and other components included in the power assignment system may be implemented as another physical device. For example, one physical device may be implemented as a part of the electronic apparatus 210 and another physical device may be implemented as a part of the first terrestrial terminal 220. In some cases, components included in the power assignment system may be distributed and arranged in different physical devices. The distributed components may be organically combined to perform functions and operations of the power assignment system. For example, the electronic apparatus 210 includes at least one sub-apparatus. Some operations described as being performed by the electronic apparatus 210 may be performed by a first sub-apparatus, and some other operations may be performed by a second sub-apparatus. As described above, the first sub-apparatus may include, for example, a central station, and the second sub-apparatus may include, for example, a satellite antenna.

Figure 3A:
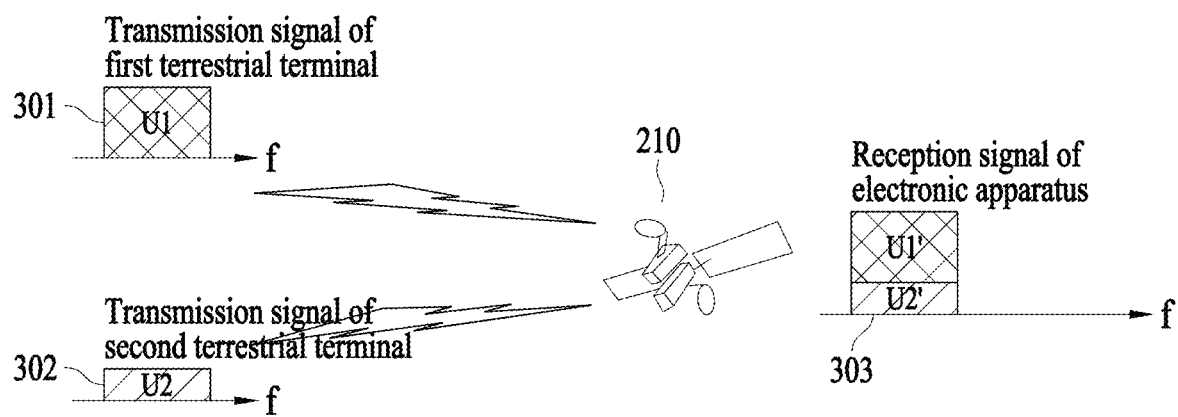
FIG. 3A is a diagram illustrating a power assignment system in an uplink according to an example embodiment.

FIG. 3A is a diagram illustrating a power assignment system in an uplink according to an example embodiment.

Referring to FIG. 3A, the electronic apparatus 210 included in the power assignment system in the uplink according to an example embodiment receives data transmission requests from the first terrestrial terminal 220 and the second terrestrial terminal 230 which use overlapped frequency resources. The electronic apparatus 210 assigns the first transmission power intensity and the second transmission power intensity to the first terrestrial terminal 220 and the second terrestrial terminal 230 based on a position of the first terrestrial terminal 220 and a position of the second terrestrial terminal 230, respectively.

The electronic apparatus 210 may assign channels for data transmission to the first terrestrial terminal 220 and the second terrestrial terminal 230. For example, the electronic apparatus 210 may assign the same channel to the first terrestrial terminal 220 and the second terrestrial terminal 230 which use overlapped frequency resources. In this example, the electronic apparatus 210 may assign a channel for receiving a signal having a first transmission power intensity and a signal having a second transmission power intensity.

The first terrestrial terminal 220 may transmit a transmission signal to the electronic apparatus 210 based on the first transmission power intensity using the assigned channel. Here, the transmission signal transmitted by the first terrestrial terminal 220 may also be referred to as a "U1 signal 301." The second terrestrial terminal 230 may transmit a transmission signal to the electronic apparatus 210 based on the second transmission power intensity using the assigned channel. Here, the transmission signal transmitted by the second terrestrial terminal 230 may also be referred to as a "U2 signal 302." The U1 signal 301 and the U2 signal 302 may be signals on which modulation or encoding has been performed for signal transmission.

The electronic apparatus 210 may receive an overlapped signal 303 in relation to the channels assigned to the first terrestrial terminal 220 and the second terrestrial terminal 230. The electronic apparatus 210 may demodulate the overlapped signal 303, thereby acquiring a U1' signal corresponding to the U1 signal 301 and a U2' signal corresponding to the U2 signal 302. For example, the U1' signal may be the same signal as the U1 signal 301 and the U2' signal may be the same signal as the U2 signal 302. In some cases, at least a portion of a signal may be changed based on various reasons such as an erroneous factor in a signal transmission and reception process. In such cases, U1' may be different from the U1 signal 301, or U2' may be different from the U2 signal 302. However, even in these cases, U1' may correspond to the U1 signal 301 and U2' correspond to the U2 signal 302.

Hereinafter, for ease and convenience of descriptions, the U1' signal acquired by demodulating the overlapped signal 303 will be described as the U1 signal 301, and the U2' signal will be described as the U2 signal 302.

The electronic apparatus 210 demodulating the overlapped signal 303 will be described in greater detail with reference to FIG. 5.

Figure 3B:
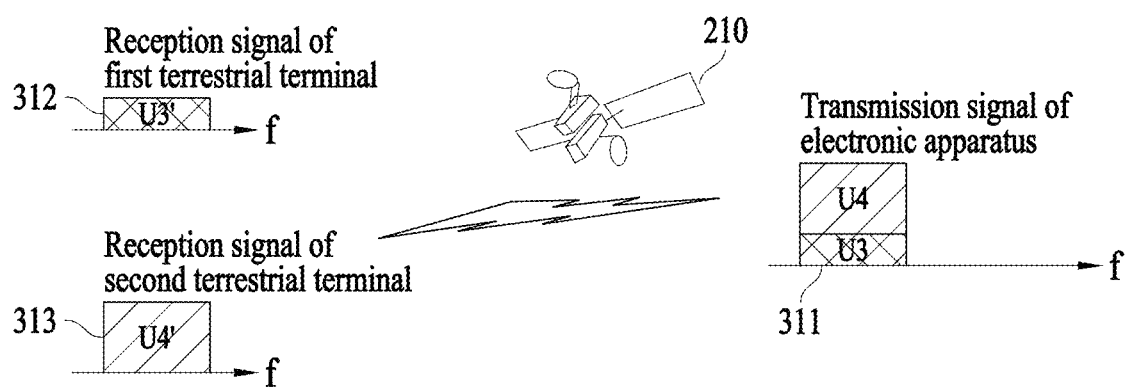
FIG. 3B is a diagram illustrating a power assignment system in a downlink according to an example embodiment.

FIG. 3B is a diagram illustrating a power assignment system in a downlink according to an example embodiment.

Referring to FIG. 3B, the electronic apparatus 210 included in the power assignment system in the downlink according to an example embodiment receives data reception requests from the first terrestrial terminal 220 and the second terrestrial terminal 230 which use overlapped frequency resources. The electronic apparatus 210 assigns the first transmission power intensity corresponding to the first terrestrial terminal 220 and the second transmission power intensity corresponding to the second terrestrial terminal 230 based on a position of the first terrestrial terminal 220 and a position of the second terrestrial terminal 230. The first transmission power intensity and the second transmission power intensity described based on the downlink may include a different concept from that of the first transmission power intensity and the second transmission power intensity described based on the uplink. Specifically, in the downlink, the first transmission power intensity may be a power intensity assigned for the electronic apparatus 210 to transmit a desired signal to be received in the first terrestrial terminal 220 and the second transmission power intensity may be a power intensity assigned for the electronic apparatus 210 to transmit a desired signal to be received in the second terrestrial terminal 230.

The electronic apparatus 210 may transmit data to the first terrestrial terminal 220 and the second terrestrial terminal 230 using one channel. In this case, the electronic apparatus 210 may assign a channel for transmitting a signal having the first transmission power intensity and a signal having the second transmission power intensity.

Using the corresponding channel, the electronic apparatus 210 may transmit an overlapped signal 311 in which a U3 signal based on the first transmission power intensity and a U4 signal based on the second transmission power intensity are overlapped. For example, the U3 signal may be a signal corresponding to data to be transmitted to the first terrestrial terminal 220 and the U4 signal may be a signal corresponding to data to be transmitted to the second terrestrial terminal 230. The U3 signal and the U4 signal may be signals on which modulation or encoding has been performed for signal transmission.

The first terrestrial terminal 220 and the second terrestrial terminal 230 may receive signals from the electronic apparatus 210. The first terrestrial terminal 220 may demodulate the overlapped signal 311, thereby acquiring a U3' signal 312 corresponding to U3. The second terrestrial terminal 230 may demodulate the overlapped signal 311, thereby acquiring a U4' signal 313 corresponding to the U4 signal. For example, the U3' signal 312 may be the same signal as the U3 signal and the U3' signal 313 may be the same signal as the U4 signal. However, in some cases, at least a portion of a signal may be changed based on various reasons such as an erroneous factor in a signal transmission and reception process. In such cases, the U3' signal 312 may be different from the U3 signal or the U4' signal 313 may be different from the U4 signal. Even in these cases, the U3' signal 312 may correspond to the U3 signal and the U4' signal 313 may correspond to the U4 signal.

Hereinafter, for ease and convenience of descriptions, the U3' signal acquired by demodulating the overlapped signal 303 will be described as the U3 signal and the U4' signal will be described as the U4 signal.

In this specification, demodulating signals received by terrestrial terminals may indicate restoring received signals to original signals in data communication, and may be understood as including an operation of demodulating a modulated signal in addition to an operation of decoding an encoded signal.

The first terrestrial terminal 220 and the second terrestrial terminal 230 demodulating the overlapped signal 311 will be described in greater detail with reference to FIG. 7.

Figure 4:
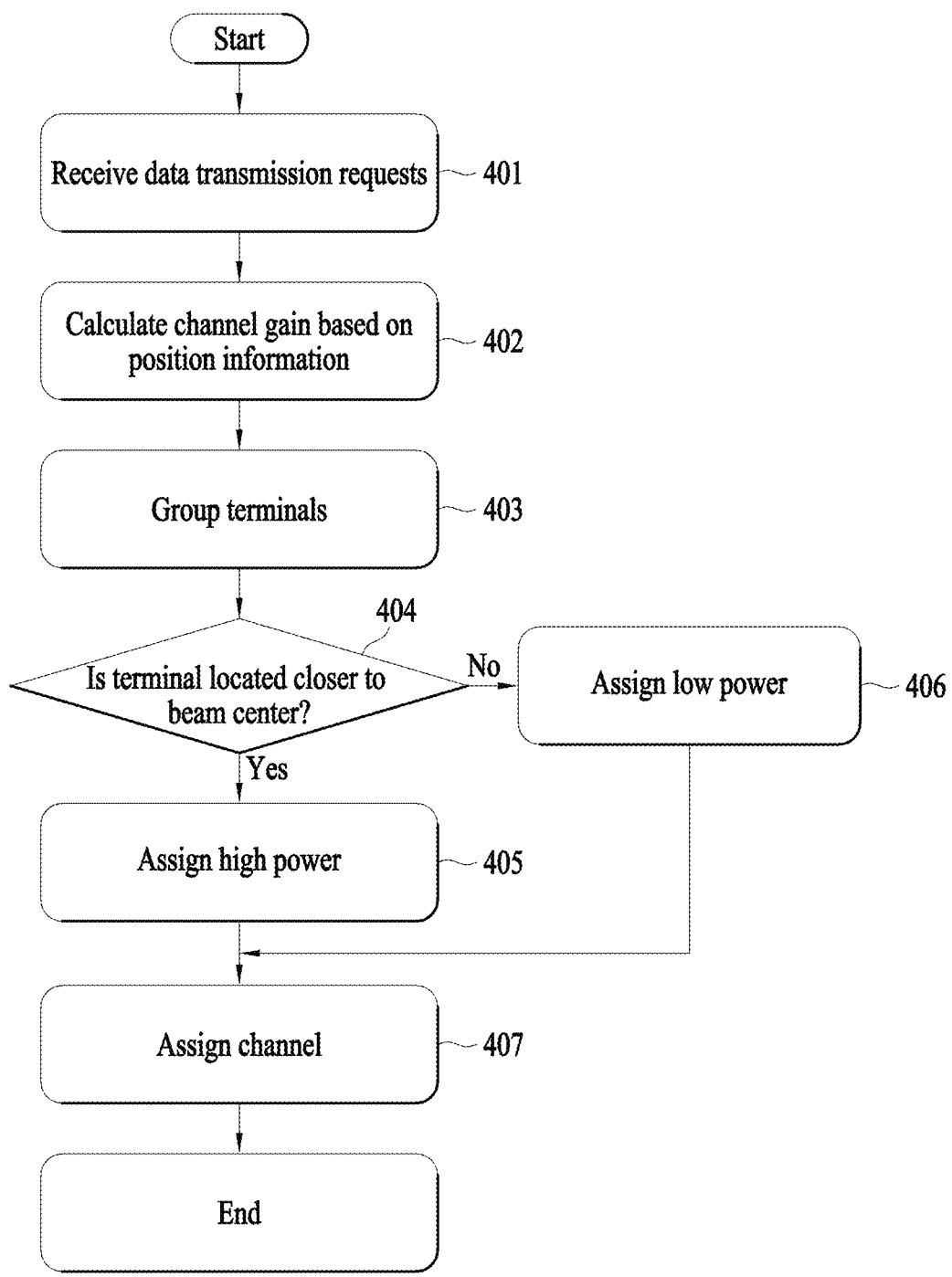
FIG. 4 is a flowchart illustrating a method of assigning power by an electronic apparatus in an uplink according to an example embodiment.

FIG. 4 is a flowchart illustrating a method of assigning power by an electronic apparatus in an uplink according to an example embodiment.

Referring to FIG. 4, in an uplink according to an example embodiment, the electronic apparatus 210 may receive data transmission requests from a plurality of terminals in operation 401 and calculate a channel gain based on position information of the plurality of terminals in operation 402. For example, instead of calculating an absolute value of the channel gain of each of the terminals, the electronic apparatus 210 may calculate a relative ratio between channel gains of the terminals based on positions of the terminals. In this case, reduced computational operations may be used to compare the channel gain between the terminals.

In operation 403, the electronic apparatus 210 may group at least a portion of the plurality of terminals. The electronic apparatus 210 may group at least a portion of the plurality of terminals based on whether data transmission/reception request times related to the plurality of terminals transmitting the data transmission requests are overlapped. For example, the electronic apparatus 210 may identify terminals of which data transmission/reception request times are at least partially overlapped and group the corresponding terminals.

In some cases, the electronic apparatus 210 may group at least a portion of the plurality of terminals further based on the calculated channel gain. For example, the electronic apparatus 210 may determine whether channel gains of the plurality of terminals have a difference greater than or equal to a predetermined ratio and group the terminals based on a determination result.

The description of operations 401 through 403 may also apply to the first terrestrial terminal 220 and the second terrestrial terminal 230. Specifically, the electronic apparatus 210 may receive data transmission requests from a plurality of terminals including the first terrestrial terminal 220 and the second terrestrial terminal 230 in operation 401 and calculate a channel gain based on position information of the plurality of terminals including the first terrestrial terminal 220 and the second terrestrial terminal 230 in operation 402. Terminals grouped based on a determination result of operation 402 may include, for example, the first terrestrial terminal 220 and the second terrestrial terminal 230.

The electronic apparatus 210 may determine whether grouped terminals (hereinafter, for ease and convenience of descriptions, described as the first terrestrial terminal 220 and the second terrestrial terminal 230) are spaced apart from a center of a satellite antenna beam corresponding to the electronic apparatus 210 and compare a distance between the first terrestrial terminal and the center of the satellite antenna beam corresponding to the electronic apparatus and a distance between the second terrestrial terminal and the center of the satellite antenna beam in operation 404. As a result of the comparing, the electronic apparatus 210 may assign a relatively high transmission power intensity to a terminal located relatively close to the center of the satellite antenna beam. For example, the electronic apparatus 210 may assign relatively high power to the first terrestrial terminal 220 located relatively close to the center of the beam in operation 405 and assign relatively low power to the second terrestrial terminal 230 located relatively far from the center of the beam in operation 406.

In this regard, a "distance separated from the center" may correspond to a distance determined in consideration of an antenna gain in addition to a physical distance. For example, in a concentric satellite antenna beam, the closer to the center, the higher the antenna gain. Thus, it is possible to relatively compare a satellite antenna beam gain for each terminal by comparing separation distances from the satellite antenna beam center to terrestrial terminals. Meanwhile, in a satellite antenna beam of a shape other than a concentric circle, the satellite antenna beam gain for each terminal may be compared using a satellite antenna gain contour based on a ground surface at a position of the terrestrial terminal, thereby determining a terminal to which relatively high power is to be assigned.

The electronic apparatus 210 may assign channels to the first terrestrial terminal 220 and the second terrestrial terminal 230 in operation 407 and receive signals transmitted by the first terrestrial terminal 220 and the second terrestrial terminal 230 based on the corresponding channels.

The electronic apparatus 210 may assign the relatively high transmission power intensity to the terminal located relatively close to the center of the satellite antenna beam such that an intensity of a signal received from the terminal located relatively close to the center of the beam and an intensity of a signal received from the terminal located relatively far from the center of the beam have a difference sufficient to perform successive interference cancellation (SIC).

Figure 5:
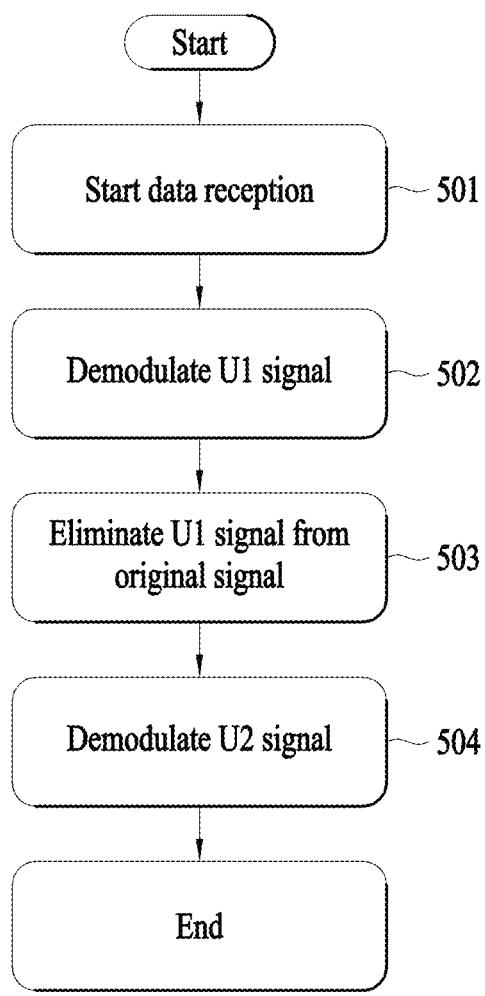
FIG. 5 is a flowchart illustrating a method of receiving an overlapped signal by an electronic apparatus in an uplink according to an example embodiment.

FIG. 5 is a flowchart illustrating a method of receiving an overlapped signal by an electronic apparatus in an uplink according to an example embodiment.

Referring to FIG. 5, in operation 501, the electronic apparatus 210 may start data reception, thereby receiving the U1 signal 301 having a first transmission power intensity and transmitted by the first terrestrial terminal 220 and the U2 signal 302 having a second transmission power intensity and transmitted by the second terrestrial terminal 230. In this case, the U1 signal 301 may be transmitted based on the higher transmission power intensity and transmitted from a terminal located closer to a center of a beam. Thus, the electronic apparatus 210 may determine that the U1 signal 301 is sufficiently greater in intensity than the U2 signal 302 and demodulate the U1 signal 301 first for the overlapped signal 303 in operation 502.

Thereafter, the electronic apparatus 210 may eliminate the U1 signal 301 from the overlapped signal 303 in operation 503 and further demodulate the U2 signal 302 in operation 504.

Figure 6:
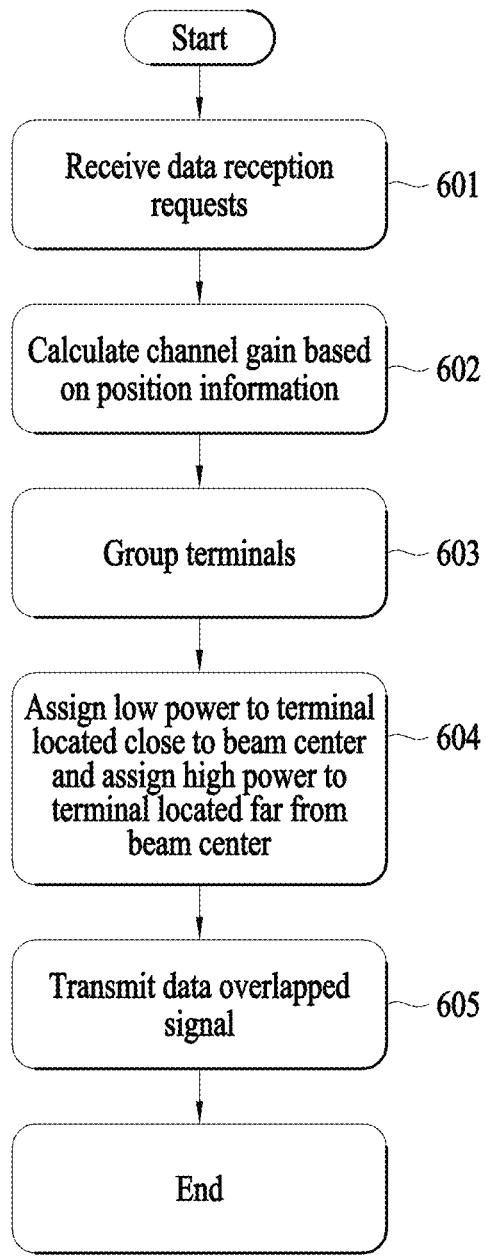
FIG. 6 is a flowchart illustrating a method of transmitting an overlapped signal by an electronic apparatus in a downlink according to an example embodiment.

FIG. 6 is a flowchart illustrating a method of transmitting an overlapped signal by an electronic apparatus in a downlink according to an example embodiment.

Referring to FIG. 6, in a downlink according to an example embodiment, the electronic apparatus 210 may receive data reception requests from a plurality of terminals in operation 601 and calculate a channel gain based on position information of the plurality of terminals in operation 602. For example, instead of calculating an absolute value of a channel gain of each of the terminals, the electronic apparatus 210 may calculate a relative ratio between channel gains of the terminals base on positions of the terminals. In this case, reduced computational operations may be used to compare the channel gain between the terminals.

In operation 603, the electronic apparatus 210 may group at least a portion of the plurality of terminals. The electronic apparatus 210 may group at least a portion of the plurality of terminals based on whether at least a portion of data transmission/reception request times related to the plurality of terminals transmitting the data transmission requests are overlapped. For example, the electronic apparatus 210 may identify terminals of which data transmission/reception request times are at least partially overlapped and group the corresponding terminals.

In some cases, the electronic apparatus 210 may group at least a portion of the plurality of terminals further based on the calculated channel gain. For example, the electronic apparatus 210 may determine whether channel gains of the plurality of terminals have a difference greater than or equal to a predetermined ratio and group the terminals based on a determination result.

The description of operations 601 through 603 may also apply to the first terrestrial terminal 220 and the second terrestrial terminal 230. Specifically, the electronic apparatus 210 may receive data reception requests from a plurality of terminals including the first terrestrial terminal 220 and the second terrestrial terminal 230 in operation 601 and calculate a channel gain based on position information of the plurality of terminals including the first terrestrial terminal 220 and the second terrestrial terminal 230 in operation 602. Terminals grouped based on a determination result of operation 602 may include, for example, the first terrestrial terminal 220 and the second terrestrial terminal 230.

The electronic apparatus 210 may determine whether grouped terminals (hereinafter, for ease and convenience of descriptions, described as the first terrestrial terminal 220 and the second terrestrial terminal 230) are spaced apart from a center of a satellite antenna beam corresponding to the electronic apparatus 210 and compare a distance between the first terrestrial terminal and the center of the satellite antenna beam corresponding to the electronic apparatus and a distance between the second terrestrial terminal and the center of the satellite antenna beam in operation 604. As a result of the comparing, the electronic apparatus 210 may assign a relatively low transmission power intensity to a terminal located relatively close to the center of the satellite antenna beam. For example, in operation 604, the electronic apparatus 210 may assign relatively low power to the first terrestrial terminal 220 located relatively close to the center of the beam and assign relatively high power to the second terrestrial terminal 230 located relatively far from the center of the beam.

In the case of downlink, like the case of uplink, a "distance separated from the center" may correspond to a distance determined in consideration of an antenna gain in addition to a physical distance. That is, in a concentric satellite antenna beam, the closer to the center, the higher the antenna gain. Accordingly, a satellite antenna beam gain for each terminal may be relatively compared by comparing separation distances from the satellite antenna beam center to terrestrial terminals. Also, in a satellite antenna beam of a shape other than a concentric circle, the satellite antenna beam gain for each terminal may be compared using a satellite antenna gain contour based on a ground surface at a position of the terrestrial terminal, thereby determining a terminal to which relatively high power is to be assigned.

In operation 605, the electronic apparatus 210 may transmit the overlapped signal 311 in which the U3 signal based on the first transmission power intensity and the U4 signal based on the second transmission power intensity are overlapped, to the first terrestrial terminal 220 and the second terrestrial terminal 230 through the downlink.

Unlike the uplink, in the downlink, lower power may be assigned to a terminal located closer. This is because, in the case of the downlink, an entity performing a demodulation operation is not the electronic apparatus 210 but the plurality of terminals. Specifically, by assigning lower power to the terminal located closer, a terminal located farther may directly demodulate a signal to be received without performing SIC.

Figure 7:
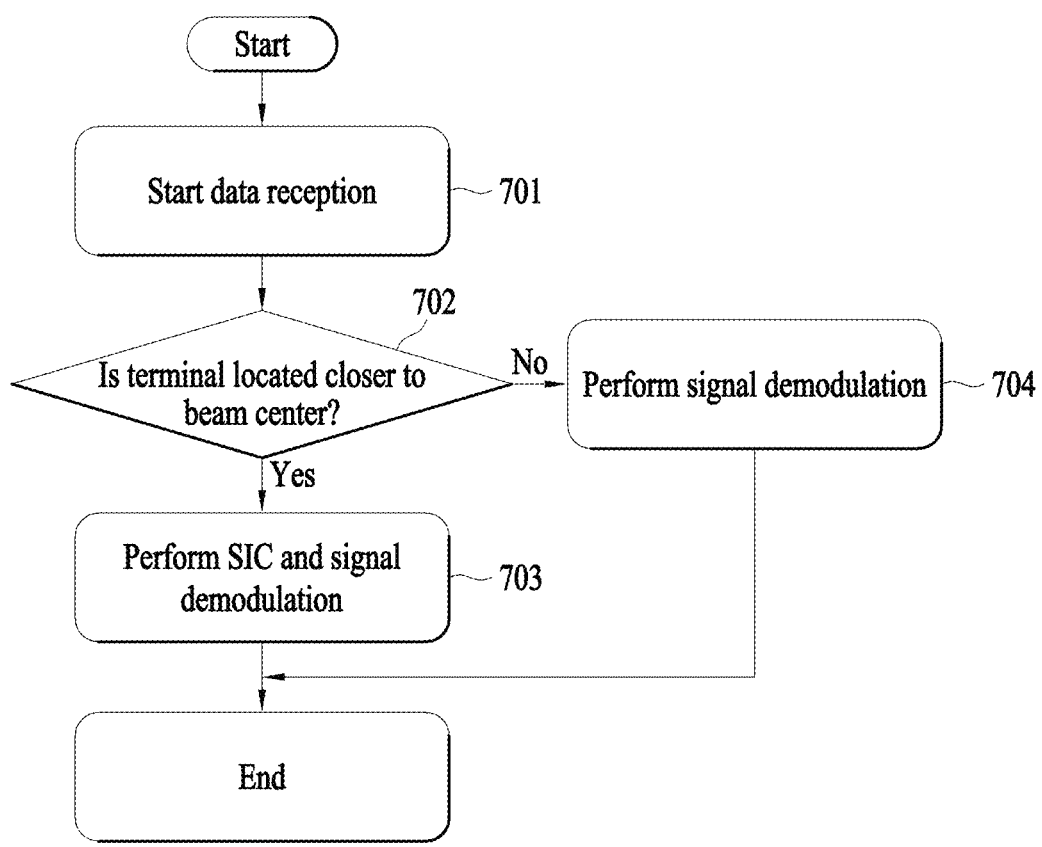
FIG. 7 is a flowchart illustrating a method of demodulating a signal based on an overlapped signal by each terminal in a downlink according to an example embodiment.

FIG. 7 is a flowchart illustrating a method of demodulating a signal based on an overlapped signal by each terminal in a downlink according to an example embodiment.

Referring to FIG. 7, in operation 701, the first terrestrial terminal 220 and the second terrestrial terminal 230 may start data reception to receive the overlapped signal 311 transmitted by the electronic apparatus 210. In operation 702, each terminal may determine whether the corresponding terminal is a terminal located closer to a center of a satellite antenna beam corresponding to the electronic apparatus 210 among grouped terminals. Since the first terrestrial terminal 220 is the terminal located closer to the center of the beam, the first terrestrial terminal 220 may be aware that a signal level of a signal U4 is higher than a signal level of a signal U3. Thus, the first terrestrial terminal 220 may demodulate the signal U4, and then finally demodulate the signal U3 by canceling an interference in the signal U4 into which an original signal is demodulated. That is, the first terrestrial terminal 220 located closer to the center of the beam may perform successive interference cancellation and signal demodulation in operation 703.

The second terrestrial terminal 230 may be a terminal located farther from the center of the beam and thus, may be aware that the signal level of the signal U4 is higher than the signal level of the signal U3. Accordingly, the second terrestrial terminal 230 may demodulate the signal U4 directly without canceling the interference in operation 704.

Figure 8:
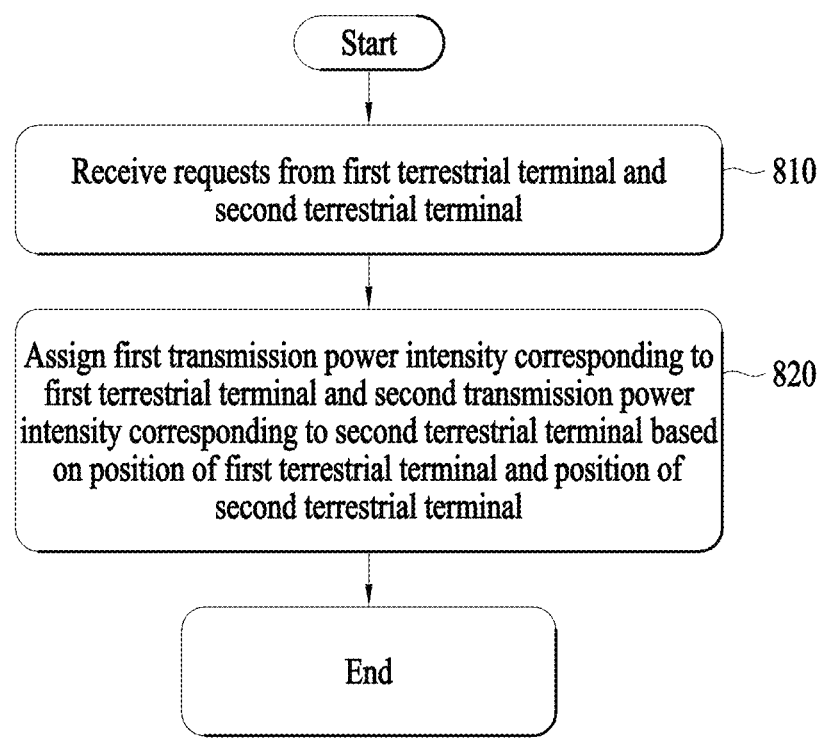
FIG. 8 is a flowchart illustrating a method of assigning power by an electronic apparatus according to an example embodiment.

FIG. 8 is a flowchart illustrating a power assignment method of an electronic apparatus according to an example embodiment.

Referring to FIG. 8, in operation 810, the electronic apparatus 210 which use overlapped frequency resources according to an example embodiment may receive requests from the first terrestrial terminal 220 and the second terrestrial terminal 230. The received requests may be, but not be limited to, data transmission requests in a case of an uplink and data reception requests in a case of a downlink. For example, a resource request may be made only once without distinguishing between the uplink and the downlink.

In operation 820, the electronic apparatus 210 may assign the first transmission power intensity corresponding to the first terrestrial terminal 220 and the second transmission power intensity corresponding to the second terrestrial terminal 230 based on a position of the first terrestrial terminal 220 and a position of the second terrestrial terminal 230. In the case of the uplink, the assigned transmission power intensities may be power intensities at which the first terrestrial terminal 220 and the second terrestrial terminal 230 transmit signals. In the case of the downlink, the assigned transmission power intensities may be power intensities at which the electronic apparatus 210 transmits signals to be received by the first terrestrial terminal 220 and the second terrestrial terminal 230.

Figure 9:
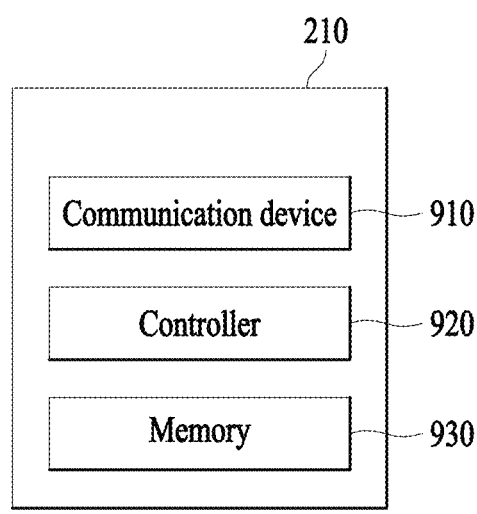
FIG. 9 is a block diagram illustrating an electronic apparatus according to an example embodiment.

FIG. 9 is a block diagram illustrating an electronic apparatus according to an example embodiment.

Referring to FIG. 9, an electronic apparatus 210 includes a communication device 910, a controller 920 (e.g., a processor), and a memory 930. The electronic apparatus 210 may be connected to the first terrestrial terminal 220, the second terrestrial terminal 230, and other external devices through the communication device 910 to perform data exchange.

The controller 920 may include one or more apparatuses described with reference to FIGS. 1 through 8 or perform at least one of the methods described with reference to FIGS. 1 through 8. The memory 930 may store information for performing at least one of the methods described with reference to FIGS. 1 through 8. The memory 930 may be a volatile memory or a non-volatile memory.

The controller 920 may execute a program and control the electronic apparatus 210 for providing information. A code of the program executed by the processor 620 may be stored in the memory 930.

In addition, according to an example embodiment, the electronic apparatus 210 may further include an interface for providing information to a user.

The present specification and drawings have been described with respect to the example embodiments of the present disclosure. Although specific terms are used, it is only used in a general sense to easily explain the technical content of the present disclosure and to help the understanding of the invention, and is not intended to limit the scope of the specification. It will be apparent to those skilled in the art that other modifications based on the technical spirit of the present invention may be implemented in addition to the embodiments disclosed herein.

The electronic apparatus or terminal in accordance with the above-described embodiments may include a processor, a memory which stores and executes program data, a permanent storage such as a disk drive, a communication port for communication with an external device, and a user interface device such as a touch panel, a key, and a button. Methods realized by software modules or algorithms may be stored in a computer-readable recording medium as computer-readable codes or program commands which may be executed by the processor. Here, the computer-readable recording medium may be a magnetic storage medium (for example, a read-only memory (ROM), a random-access memory (RAM), a floppy disk, or a hard disk) or an optical reading medium (for example, a CD-ROM or a digital versatile disc (DVD)). The computer-readable recording medium may be dispersed to computer systems connected by a network so that computer-readable codes may be stored and executed in a dispersion manner. The medium may be read by a computer, may be stored in a memory, and may be executed by the processor.

The present embodiments may be represented by functional blocks and various processing steps. These functional blocks may be implemented by various numbers of hardware and/or software configurations that execute specific functions. For example, the present embodiments may adopt direct circuit configurations such as a memory, a processor, a logic circuit, and a look-up table that may execute various functions by control of one or more microprocessors or other control devices. Similarly to that elements may be executed by software programming or software elements, the present embodiments may be implemented by programming or scripting languages such as C, C++, Java, and assembler including various algorithms implemented by combinations of data structures, processes, routines, or of other programming configurations. Functional aspects may be implemented by algorithms executed by one or more processors. In addition, the present embodiments may adopt the related art for electronic environment setting, signal processing, and/or data processing, for example. The terms "mechanism", "element", "means", and "configuration" may be widely used and are not limited to mechanical and physical components. These terms may include meaning of a series of routines of software in association with a processor, for example.

It will be apparent to those skilled in the art that various modifications and variations can be made in the embodiments of the present invention without departing form the spirit or scope of the invention. Thus, it is intended that the present invention cover the modifications and variations of this invention provided they come within the scope of the appended claims and their equivalents.

What is claimed is:

1. A method of performing an uplink-related operation in an electronic apparatus, the method comprising:
   receiving data transmission requests from a first terrestrial terminal and a second terrestrial terminal, wherein the first terrestrial terminal and the second terrestrial terminal use overlapped frequency resources; and
   assigning a first transmission power intensity to the first terrestrial terminal and assigning a second transmission power intensity to the second terrestrial terminal based on a position of the first terrestrial terminal and a position of the second terrestrial terminal,
   wherein the assigning of the first transmission power intensity and the second transmission power intensity comprises:
   comparing a distance to which the first terrestrial terminal is separated from a center of a satellite antenna beam corresponding to the electronic apparatus and a distance to which the second terrestrial terminal is separated from the center of the satellite antenna beam; and
   assigning a relatively high transmission power intensity to a terminal located relatively close to the center of the satellite antenna beam as a result of the comparing.

2. The method of claim 1, further comprising:
   assigning, in response to the data transmission requests, channels for receiving a signal having the first transmission power intensity and a signal having the second transmission power intensity.

3. The method of claim 1, further comprising:
   receiving a signal having the first transmission power intensity and transmitted by the first terrestrial terminal and a signal having the second transmission power intensity and transmitted by the second terrestrial terminal;
   demodulating a signal transmitted by a terminal located relatively close to a center of a satellite antenna beam corresponding to the electronic apparatus, the terminal being one of the first terrestrial terminal and the second terrestrial terminal; and
   demodulating, after the signal transmitted by the terminal is demodulated, a signal transmitted by a terminal located relatively far from the center of the satellite antenna beam, the terminal being a remaining one of the first terrestrial terminal and the second terrestrial terminal.

4. The method of claim 1, wherein the electronic apparatus periodically receives position information from a plurality of terrestrial terminals including the first terrestrial terminal and the second terrestrial terminal.

5. A method of performing a downlink-related operation in an electronic apparatus, the method comprising:
   receiving data reception requests from a first terrestrial terminal and a second terrestrial terminal, wherein the first terrestrial terminal and the second terrestrial terminal use overlapped frequency resources; and
   assigning a first transmission power intensity corresponding to the first terrestrial terminal and assigning a second transmission power intensity corresponding to the second terrestrial terminal based on a position of the first terrestrial terminal and a position of the second terrestrial terminal,
   wherein the assigning of the first transmission power intensity and the second transmission power intensity comprises:
   comparing a distance to which the first terrestrial terminal is separated from a center of a satellite antenna beam corresponding to the electronic apparatus and a distance to which the second terrestrial terminal is separated from the center of the satellite antenna beam; and
   assigning a relatively low transmission power intensity to a terminal located relatively close to the center of the satellite antenna beam as a result of the comparing.

6. The method of claim 5, further comprising:
   overlapping a signal having the first transmission power intensity and a signal having the second transmission power intensity and transmitting an overlapped signal through a downlink.

7. The method of claim 5, wherein the electronic apparatus periodically receives position information from a plurality of terrestrial terminals including the first terrestrial terminal and the second terrestrial terminal.

8. An electronic apparatus for performing an uplink-related operation, the electronic apparatus comprising:
   a communication device configured to receive data transmission requests from a first terrestrial terminal and a second terrestrial terminal, wherein the first terrestrial terminal and the second terrestrial terminal use overlapped frequency resources;
   a memory in which at least one instruction is stored; and
   a controller configured to assign a first transmission power intensity to the first terrestrial terminal and assign a second transmission power intensity to the second terrestrial terminal based on a position of the first terrestrial terminal and a position of the second terrestrial terminal,
   wherein the controller is configured to assign the first transmission power intensity and the second transmission power intensity by:
   comparing a distance to which the first terrestrial terminal is separated from a center of a satellite antenna beam corresponding to the electronic apparatus and a distance to which the second terrestrial terminal is separated from the center of the satellite antenna beam; and
   assigning a relatively high transmission power intensity to a terminal located relatively close to the center of the satellite antenna beam as a result of the comparing.

9. An electronic apparatus for performing a downlink-related operation, the electronic apparatus comprising:
   a communication device configured to receive data reception requests from a first terrestrial terminal and a second terrestrial terminal, wherein the first terrestrial terminal and the second terrestrial terminal use overlapped frequency resources;
   a memory in which at least one instruction is stored; and
   a controller configured to assign a first transmission power intensity corresponding to the first terrestrial terminal and assign a second transmission power intensity corresponding to the second terrestrial terminal based on a position of the first terrestrial terminal and a position of the second terrestrial terminal,
   wherein the controller is configured to assign the first transmission power intensity and the second transmission power intensity by:
   comparing a distance to which the first terrestrial terminal is separated from a center of a satellite antenna beam corresponding to the electronic apparatus and a distance to which the second terrestrial terminal is separated from the center of the satellite antenna beam; and
assigning a relatively low transmission power intensity to a terminal located relatively close to the center of the satellite antenna beam as a result of the comparing.

\* \* \* \* \*